(12) United States Patent
Eichholz et al.

(10) Patent No.: US 7,530,238 B2
(45) Date of Patent: May 12, 2009

(54) HEATING APPARATUS WITH ELECTRODE FOR THE CONDUCTIVE HEATING OF MELTS

(75) Inventors: Rainer Eichholz, Duisburg (DE); Guido Raeke, Pfaffen-Schwabenheim (DE); Volker Ohmstede, Bingen (DE); Gunter Weidmann, Flonheim (DE); Frank-Thomas Lentes, Bingen (DE); Thomas Stelle, Mainz (DE); Ernst-Walter Schaefer, Welgensheim (DE); Hildegard Roemer, Floersheim (DE); Joerg Schollmayer, Mainz (DE); Holger Hunnius, Mainz (DE); Frank-Jurgen Druschke, Bechtolsheim (DE)

(73) Assignee: Schott AG, Mainz (DE)

( * ) Notice: Subject to any disclaimer, the term of this patent is extended or adjusted under 35 U.S.C. 154(b) by 454 days.

(21) Appl. No.: 10/536,538

(22) PCT Filed: Nov. 27, 2003

(86) PCT No.: PCT/EP03/13352

§ 371 (c)(1),
(2), (4) Date: Dec. 5, 2005

(87) PCT Pub. No.: WO2004/052053

PCT Pub. Date: Jun. 17, 2004

(65) Prior Publication Data

US 2006/0137402 A1 Jun. 29, 2006

(30) Foreign Application Priority Data

Dec. 3, 2002 (DE) .................. 102 56 657
Dec. 4, 2002 (DE) .................. 102 56 594

(51) Int. Cl.
*C03B 9/38* (2006.01)
(52) U.S. Cl. .................. 65/355; 65/247; 65/135.6
(58) Field of Classification Search .................. 65/355, 65/347, 135.6
See application file for complete search history.

(56) References Cited

FOREIGN PATENT DOCUMENTS

DE 199 25 554 7/2000
GB 644 463 11/1950

*Primary Examiner*—Mark Halpern
(74) *Attorney, Agent, or Firm*—Ohlandt, Greeley, Ruggiero & Perle, L.L.P.

(57) ABSTRACT

A heating apparatus for the conductive heating of melts, in particular for the rapid melting-down, refining and/or conditioning of melts, is provided. The heating apparatus includes at least one electrode, as well as a first cooling system with a cooling power, which can be set and/or controlled variably.

37 Claims, 4 Drawing Sheets

HEATING APPARATUS WITH ELECTRODE FOR THE CONDUCTIVE HEATING OF MELTS

This application is a 371 of PCT/EP03/13352 filed on 27 Nov. 2003.

BACKGROUND OF THE INVENTION

1. Field of the Invention

The invention relates to a heating apparatus for the conductive resistance heating of melts, in particular for the rapid melting-down of batch and/or for the refining and/or conditioning of melts, which comprises at least one electrode for the conductive heating of melts, in particular a cooled electrode for the conductive heating of melts.

2. Description of Related Art

The conductive heating of melts is used, inter alia, in the refining of glass melts. During refining, bubbles are expelled from the glass melt, preferably by adding special refining agents. To enable the bubbles to be expelled, it is desirable for the viscosity of the melt to be as low as possible. This is generally achieved by high temperatures being set in a refining zone of the melt. However, it is impossible to select any desired high temperatures in the melt, since the temperature which can be set is subject to restrictions in terms of the finite thermal stability of the components of the melting apparatus. In particular, there are no known contact materials which can be used in practice and have a long-term stability at temperatures above 1 700° C.

In order nevertheless to allow higher temperatures to be reached, it is known to use water-cooled, metallic wall parts for the melting tank. However, the cooled wall parts cause high energy losses, which have to be compensated for by heating again. Heating which is suitable for high-temperature refining therefore has to apply sufficiently high heating powers.

Radiofrequency heating, inter alia, is used to heat the melt. This technique is also used in particular together with the skull technique, i.e. with cooled wall parts. However, radiofrequency heating is not suitable for all types of glass, since the melts have to have a certain minimum conductivity. For example, the method is unsuitable for melt conductivities lower than 0.01 $\Omega^{-1}$ cm$^{-1}$. However, the process stability of radiofrequency heating becomes so poor even at conductivities below approximately 0.1 $\Omega^{-1}$ cm$^{-1}$ that this technique is of only limited use or is scarcely viable in these cases.

Alkali metal ions are particularly responsible for achieving a good conductivity in glass melts. On the other hand, glasses which contain little if any alkali metal often have only a poor conductivity. However, in particular glasses of this type are often special technical-grade glasses, in which a particularly high purity and absence of bubbles is important, yet these glasses can only be treated with difficulty by radiofrequency heating, on account of their poor conductivity.

In addition to radiofrequency heating, it is also possible to use water-cooled electrodes for the conductive heating of melts. GB 644 463 describes a hollow electrode which is cylindrical in form or in some other form, can be made from metal and is provided in the interior with a coaxially arranged hollow body within which a cooling fluid circulates. GB 644,463 has furthermore disclosed a water-cooled platinum electrode which can only be operated effectively at substantially one thermal operating point. In this case, it must always be ensured that the platinum electrode is not damaged by overheating. However, since heating of the melt also presents a risk of damage to the platinum electrode, the coolant supplied will generally effect cooling which maintains a safe thermal distance below the temperatures at which the platinum can be damaged. However, as a result some of the heating power of the conductive electrodes is "cooled away" again and has to be compensated for by an increased supply of energy. The additional heating power is absorbed again by an increased cooling power, and the thermal safety margin represents an extremely unsatisfactory overall energy balance when using conventional cooled electrodes.

Furthermore, in the event of uncontrollable and excessive cooling of the conventional electrodes, there is a risk of the conductive heating being impossible to start, on account of a high transfer resistance between electrode and melt, caused by glass frozen onto the electrode.

DE 199 25 554 A1 describes a bottom electrode for metallurgical melting vessels, in which a cooling plate is arranged at a distance below the carrier plate which carries the contact elements. A cooling medium flows through the cooling space which is thereby formed; the cooling action of this cooling medium is intensified by cooling fins which are arranged in the cooling space and are welded to the carrier plate and preferably also to the cooling plate.

Furthermore, the local cooling power on the surface of these electrodes is substantially predetermined by the arrangement of the cooling passages and by the electrode geometry, and therefore cannot be adapted to the external conditions.

BRIEF SUMMARY OF THE INVENTION

The invention is based on the object of providing a heating apparatus for the conductive heating of melts which allows improved cooling.

This object is achieved in a very surprisingly simple way by a heating apparatus as described in claim 1.

Advantageous refinements and configurations form the subject matter of the dependent subclaims.

Accordingly, a heating apparatus according to the invention for the conductive heating of melts, in particular for the rapid-melting-down refining and/or conditioning of melts, comprises at least one electrode and at least a first cooling system with means for controlling the cooling power variably as a function of time and location in a plurality of selectable regions of the electrode.

The variable setting and/or control of the cooling power can be set and/or controlled variably both as a function of time and as a function of location at the surface at which the melt contact material of the electrode is in contact with the melt.

Therefore, it is extremely advantageously possible to influence not only the temperature of the surface of the melt contact material, but also the spatial temperature distribution within the melt itself. In this way it is possible, for example, to determine not only the temperature of the melt but also the shape and direction of convective flows in the melt.

In this context, the conditioning of melts means preparing a melt for the conditions of hot-forming. These comprise in particular a reduction in the temperature level and homogenization of the temperature distribution.

It has hitherto been almost impossible to influence the spatial temperature distribution, or the spatial introduction of energy, by the defined intensity distribution of the radiofrequency field used for heating or the electrode geometry both in the case of radiofrequency heating and in the case of conductive heating. By contrast, the invention allows the spatial melt temperature distribution to be set and/or controlled variably, and moreover the usability of the invention, unlike in the case of radiofrequency heating, is subject to scarcely any restrictions in terms of the conductivity of the melt.

On the other hand, an apparatus according to the invention can also be operated in such a way that the heat flux passing through the electrode on account of temperature gradients within the melt is compensated for, so that a uniform surface temperature is achieved on the melt contact material of the electrode. This allows the cooling power to be reduced to the required minimum and also allows the heating power to be reduced, thereby considerably improving the overall energy balance. Moreover, the surface temperature can safely be kept close to the material-dependent limits. By way of example, a platinum electrode should not be heated to over 1 650° C. even briefly, and in long-term operation should not be heated to over 1 550° C. The apparatus according to the invention allows operation in which the temperature of virtually the entire surface of the melt contact material of the electrode can be uniformly kept close to this limit. By contrast, by reducing the cooling power and implementing a surface of the melt contact material which is as uniformly hot as possible, it is in this way possible to achieve a high peak temperature in the melt which is well above the temperature of the surface of the melt contact material. In a manner which is in accordance with the invention and surprising to the person skilled in the art, the melt temperature in the melt can for the first time be more than 200° C. above the highest temperature at the electrode surface. This correspondingly also improves and accelerates the refining of the melt. However, the invention also provides advantages even if the temperature of regions of the melt is only 50° C., 100° C. or 150° C. above the temperature of the electrode surface.

In this way, the temperature in the melt, at least in a region of the melt, can exceed the application limit temperature for the melt contact material of the electrode. The application limit temperature is to be understood as meaning the temperature up to which it is possible to use the electrodes for the most conventional electrode or melt contact materials. Application limit temperatures for various melt contact materials are also described in the PCT application, filed on the same day as the present application in the name of the present Applicant, entitled "Process and Apparatus for Heating Melts", the content of disclosure of which in this respect is hereby incorporated in the subject matter of the present application.

Application limit temperatures for various melt contact materials are given, inter alia, in the following publications

[1] Johnson Matthey Noble Metals: "Platinum Sheet Material for the Glass Industry";

[2] Glass Science and Technology 13: "Metals in Glassmaking", Roland Kirsch (Ed.), Elsevier, Amsterdam, London, New York, Tokyo, 1993

[3] E. Drost, H. Gölitzer, M. Poniatowski, S. Zeuner: "Platinwerkstoffe für Hochtemperatur-Einsatz" [Platinum materials for high-temperature use], Metall—Internationale Zeitschrift für Technik und Wirtschaft No. 7/8 1996, pages 492-498, Metallverlag Berlin/Heidelberg 7/8 1996, and

[4] "Precious Metals Science and Technology": L. S. Benner, T. Suzuki, K. Meguro, S. Tanaka (Eds.), The International Precious Metals Institute, USA, 1991, the content of disclosure of which in this respect is likewise hereby incorporated by reference in the present invention.

Moreover, it is within the scope of the invention to provide a melting unit for the conductive heating of melts which comprises at least one heating apparatus according to the invention. A melting and/or refining unit of this type, in which the heating apparatus according to the invention can be used as electrode, is also described in the PCT application, filed on the same date as the present invention and in the name of the present Applicant, entitled "Process and Apparatus for Heating Melts". The content of disclosure of this application relating to the design of a suitable melting and/or refining unit and the melting, refining and conditioning processes described therein is hereby incorporated in its entirety in the subject matter of the present application.

In general, a corresponding melting and/or refining apparatus will have two or more of the heating apparatuses according to the invention, with the operating voltage being applied between the electrodes of at least two heating apparatuses. The heating apparatuses are preferably operated with alternating current, preferably with alternating current with frequencies in the range from 20 Hz to 20 KHz, particularly preferably in the range from 2 kHz to 10 kHz, since the susceptibility of the glass or melt contact material of the electrodes to corrosion decreases as the frequency rises. However, operation at mains frequency (approx. 50 or 60 Hz) is also possible.

Moreover, to achieve high cooling powers, it is advantageous if the cooling system comprises a fluid-delivery device. The fluid-delivery device is used to pass the cooling fluid through the heating apparatus. The fluid-delivery device may advantageously also be designed such that it can be set and in particular controlled variably, in order to enable the total cooling power of the cooling system to be set.

The cooling system may advantageously also comprise a multiplicity of fluid-conducting passages, through which the coolant is passed so that it absorbs heat from the electrode. The large number of such passages allows the cooling power to be locally uniformly distributed in the heating apparatus. The individual passages may, for example, also have different diameters.

The setting or control of the cooling power of the heating apparatus according to the invention can still be improved considerably by at least one fluid-conducting passage being connected to a device for setting and/or controlling the through-flow of cooling fluid. This device may, for example, comprise a setting or control valve. In this way, the cooling power of the fluid-conducting passage can be set individually by setting the device or controlled on the basis of predetermined control characteristic curves. Temporal and local, in particular lateral temperature profiles can be set on the surface of the melt contact material in particular by means of a large number of devices of this type, and reliably maintained in particular by control. By way of example, this allows accurate setting of the form and direction of the convective flows present in the melt.

The cooling system can be designed for various types of coolant. By way of example, the cooling system may comprise air cooling and/or liquid cooling and/or aerosol cooling.

To achieve cooling that can be set and/or controlled as a function of time and/or location, it is also advantageous if the heating apparatus comprises a further cooling system. A suitable arrangement of the cooling system allows local adaptation of the cooling power by matching the cooling powers. The cooling systems may also be configured in such a way that one of the systems provides rough control or setting of the overall cooling power, and the other provides precision control or setting thereof. Accordingly, it is also particularly advantageous if the cooling systems can also be controlled independently of one another by means of a corresponding device.

The further cooling system is preferably also equipped with a multiplicity of fluid-conducting passages, allowing locally distributed dissipation of heat. These passages may also be connected to a device for setting and/or controlling the through-flow of cooling fluid.

According to one embodiment of a heating apparatus according to the invention, the temperature profile can be set in two mutually perpendicular directions along the electrode surface. This can be achieved, for example, by at least sections of the fluid-conducting passages of the further cooling system running transversely with respect to sections of fluid-conducting passages of the first cooling system, preferably as seen in a direction perpendicular to the heat propagation direction. This type of arrangement of passages running transversely with respect to one another allows a two-dimensional temperature or cooling power profile to be set by individual setting or control of the flow of coolant through these passages. However, an advantage of this type can also be achieved, for example, by at least sections of the fluid-conducting passages of the first cooling system running transversely or parallel to one another in different planes.

The fluid-conducting passages of the first and further cooling systems may also particularly preferably be guided into one another at least in sections. This arrangement is distinguished, inter alia, by a particularly compact and simple structure.

Moreover, it is preferable for the fluid-conducting passages to be arranged in such a way that at least a section of the fluid-conducting passages of the first cooling system are arranged closer to the melt contact surface of the electrode than the fluid-conducting passages of the second cooling system. In this way, two-stage cooling is realized in the direction of the heat flux, which is directed away from the melt contact surface of the electrode toward those parts of the heating apparatus which are remote from the melt contact surface of the electrode. This allows the temperature profile to be set and/or controlled in this direction too. In this way, it is also possible for the cooling power of the cooling system which is active closer to the melt contact surface to be reduced, which generally allows more accurate setting and control of this cooling system.

Moreover, the heating apparatus may comprise a settable or controllable heating power control, in order to allow not just the cooling power but also the heating power to be adapted. The heating and cooling power may advantageously also be controlled as a function of one another, so that, for example, the settable or controllable heating power control controls the heating current and/or the voltage between the electrodes as a function of the cooling power and/or the melting temperature and/or the electrode temperature.

In this context, temperature-dependent control, which, for example, can be used to prevent overheating of the melt contact material, is also particularly advantageous.

The at least one electrode may advantageously be secured to a supporting apparatus. The supporting apparatus is in this case preferably arranged on a side remote from the melt contact surface. In this context, it is also expedient if one of the cooling systems, in particular the second cooling system, cools the supporting apparatus. The supporting apparatus is preferably made from refractory material, such as for example refractory bricks or ceramics. In particular, the supporting apparatus may also be of multilayer structure and/or designed in sandwich form, in which case the layers preferably follow one another in the heat propagation direction or along the direction of the forces exerted by the hydrostatic pressure of the melt. In this way, by way of example, it is possible to improve the thermal conductivity of the supporting apparatus and/or its mechanical stability. A multilayer structure makes it possible, for example, to combine materials with different thermal conductivities or specific heat capacities in the supporting apparatus.

A sandwich design in which the supporting apparatus includes a first layer, which is arranged between the electrode and at least one subsequent second layer, with the first layer having a higher thermal conductivity than the second layer, is particularly preferred. As a result, the heat produced by the melt contact material is successfully absorbed and dissipated by the first layer. On account of the lower thermal conductivity of the second layer, on the other hand, only a small amount of heat is dissipated to the outside, but rather this heat is predominantly dissipated by cooling. By way of example, fused-cast and/or dense-sintered materials, such as fused-cast aluminum-zirconium silicates (AZS) and/or aluminum oxide and/or fused-cast high zirconium-containing materials (HZFC), are suitable for the first layer. Inter alia ceramic-bonded materials, such as mullite, sintered quartz glass or slip-cast silica glass, also known as Quarzal, are suitable for the second layer. These materials have a lower thermal conductivity and accordingly dissipate less heat to the outside.

Particularly effective cooling of the electrode can be achieved by the at least one electrode bearing against at least one side of the supporting apparatus, with at least a section of a fluid-conducting passage of the cooling system extending along this side of the supporting apparatus. The cooling can be improved still further by the portion of the at least one fluid-conducting passage being designed to be open toward the electrode or, in the case of a sandwich design, toward the first layer. In this way, the cooling fluid comes into direct contact with the electrode material as it flows through the passage.

Moreover, a refinement of the heating apparatus according to the invention in which the at least one electrode comprises at least two electrode segments is also advantageous. The electrode segments may, inter alia, be suitable for distributing the power density between a plurality of separate segments by means of the conductive heating.

Moreover, it is in this context particularly advantageous if the electrode segments are insulated with respect to one another. The electrode segments can then be supplied with current separately, which brings with it a range of advantages. In particular, the heating apparatus may also be operated in such a way that the current flows through the melt between the electrode segments. By way of example, this facilitates the melting-down of material that is to be melted, since only a small area of the material to be melted has to be melted down in the melting or refining unit in which the heating apparatus is used before a bridge of molten material connects the electrode segments. The further melting-down can then be effected by operation of the electrode segments and of the heating electrodes. Moreover, operation of this nature allows convective circulation to be implemented between the electrode segments in the melting or refining unit.

The at least one electrode advantageously comprises a melt contact material which is conductive at least at elevated temperatures and is thermally stable, and moreover is substantially inert on contact with the melt. In this context, by way of example a material which comprises electrically conductive ceramic, such as for example $SnO_2$ ceramic, and/or refractory metals, such as in particular platinum metals, for example iridium, rhodium, platinum and alloys thereof, or high-melting refractory metals, such as tungsten, molybdenum, osmium, hafnium, tantalum and alloys thereof, is particularly suitable as melt contact material in particular for glass melts.

Moreover, the melt contact material may comprise a fine-grain-stabilized material. Fine-grain-stabilized materials are also known as dispersion-consolidated materials or oxidedispersion-hardened materials. These are generally distinguished by a high strength and a good long-term stability. Fine-grain-stabilized materials of this type may, for example, include high-strength platinum or iridium materials.

According to one embodiment of the invention, the at least one electrode of the heating apparatus forms a wall region of a crucible. The crucible may, for example, in a further configuration of the invention, also be designed as a skull crucible with cooled walls.

The external shape and curvature of the melt contact surface of the melt contact material of the at least one electrode can be selected as desired and matched to the particular application, for example the specific shape of crucible. Therefore, the contact surface of the melt contact material may, for example, be either flat or convexly or concavely curved. Depending on the particular application, the contact surface may also, for example, be square, rectangular, oval or round in shape.

The heating apparatuses may advantageously be installed in the melting vessel in such a way as to be exchangeable. To prevent melt from flowing out between the heating apparatus and a section of the wall of a melting unit in which the heating apparatus is fitted, it is advantageous for the heating apparatus to have edge cooling. In this case, melt which flows past the edges is solidified, thereby creating the desired seal.

To enable the temperature or cooling power to be controlled as accurately as possible, it is advantageous if the heating apparatus has at least one temperature sensor, such as for example a thermocouple. The measured values from the temperature sensor can then be processed, for example by a computer device, which for its part can control the cooling power as a function of time and/or location by using these data. The accurate setting of the cooling power is also assisted in this way.

It is likewise advantageous if the cooling system comprises at least one flowmeter. A flowmeter of this type can deliver actual values which can be compared with set values for the flow of coolant through the cooling system, in order to allow stable operation with defined parameters.

When starting up a melting unit having heating apparatuses according to the invention, first of all they must be a sufficient conductivity in the melt to allow conductive heating by the heating apparatuses. The melting unit may have suitable devices for heating and melting down batch or the cooled material to be melted. However, in particular in the vicinity of the melt contact surface of the electrodes of the heating apparatuses, the conductivity of the melt may be insufficient to allow enough current to flow through the melt. Also, there may be an insulating air gap between the melt contact material of the heating apparatus and the cooled material to be melted. This air gap is formed through shrinkage of the material to be melted as it cools. If a voltage is applied to the electrode when an air gap is present, the air gap can be locally bridged by ionization so that the current shoots through at this location, which can lead to damage to the melt contact material. Therefore, the heating apparatus may advantageously comprise a device for heating an electrode, which can be used for direct heating of the electrode. As a result, the material to be melted can be partially melted in the region of the melt contact surface, in order to achieve sufficient conductivity or to allow the unit to be started up.

A suitable device for heating the electrode is in particular an ohmic heating device. The latter may preferably comprise a current source which is connected to the melt contact material or a conductive material below it, thereby forcing a current through the melt contact material or the conductive material below it, in a direction which is transverse with respect to the melt contact surface, so that it is suitable for heating the melt or glass contact material and/or parts of the electrode itself. This operation is also referred to below as transverse-current mode.

The device for heating the electrode may also comprise a device for heating the cooling fluid. This makes it possible, for example, to heat the melt contact surface of the electrode to a temperature above the dew point. This is advantageous in particular if precipitation of moisture, as occurs, for example, when using fossil fuels before initial heating or preheating when starting up, is to be prevented.

The invention is explained in more detail below on the basis of preferred embodiments and with reference to the appended drawings, in which identical reference symbols denote similar or identical parts.

DETAILED DESCRIPTION OF THE INVENTION

Figure 1:
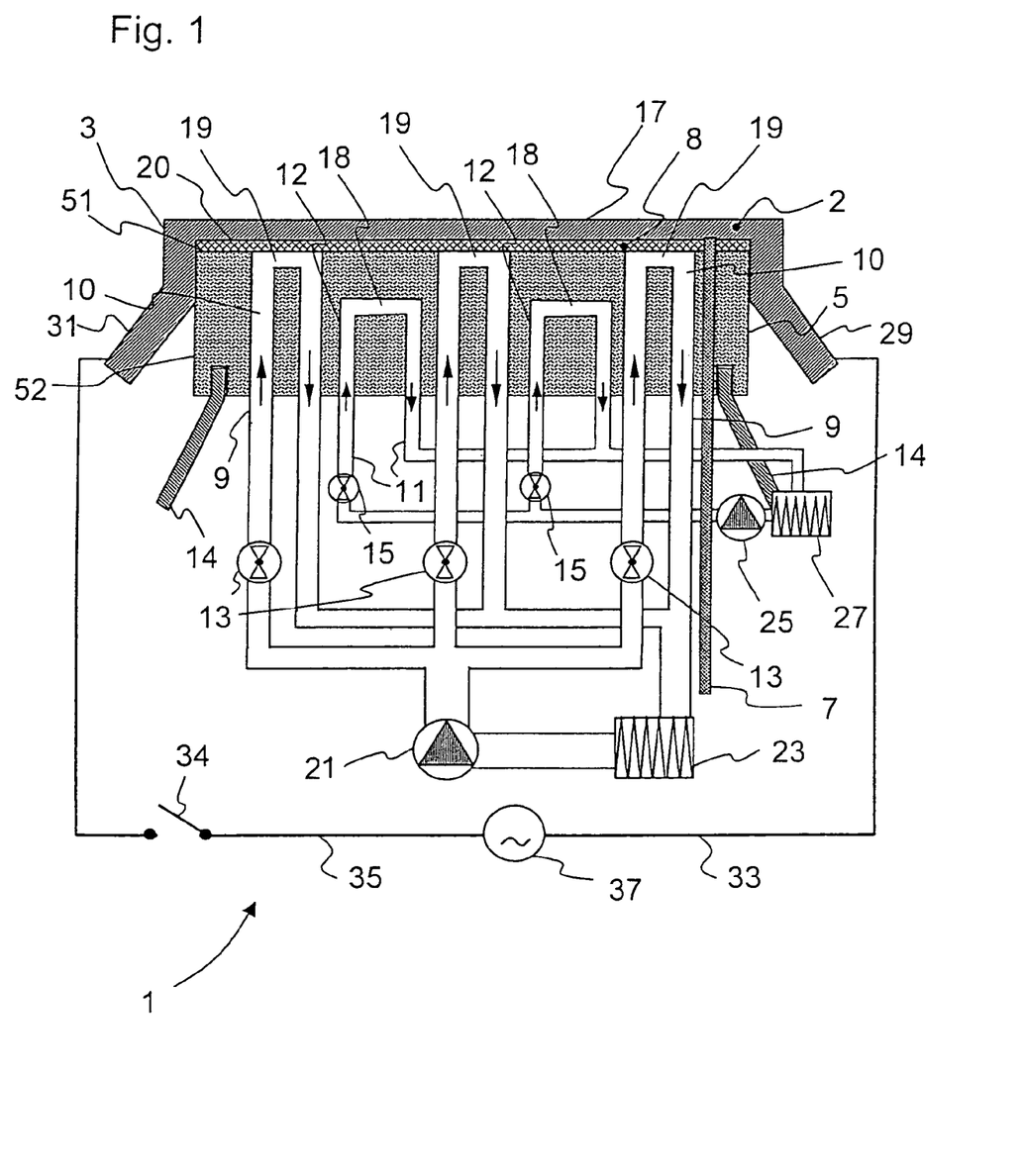
FIG. 1 shows a diagrammatic cross section through a first embodiment of the heating apparatus according to the invention.
Figure 2:
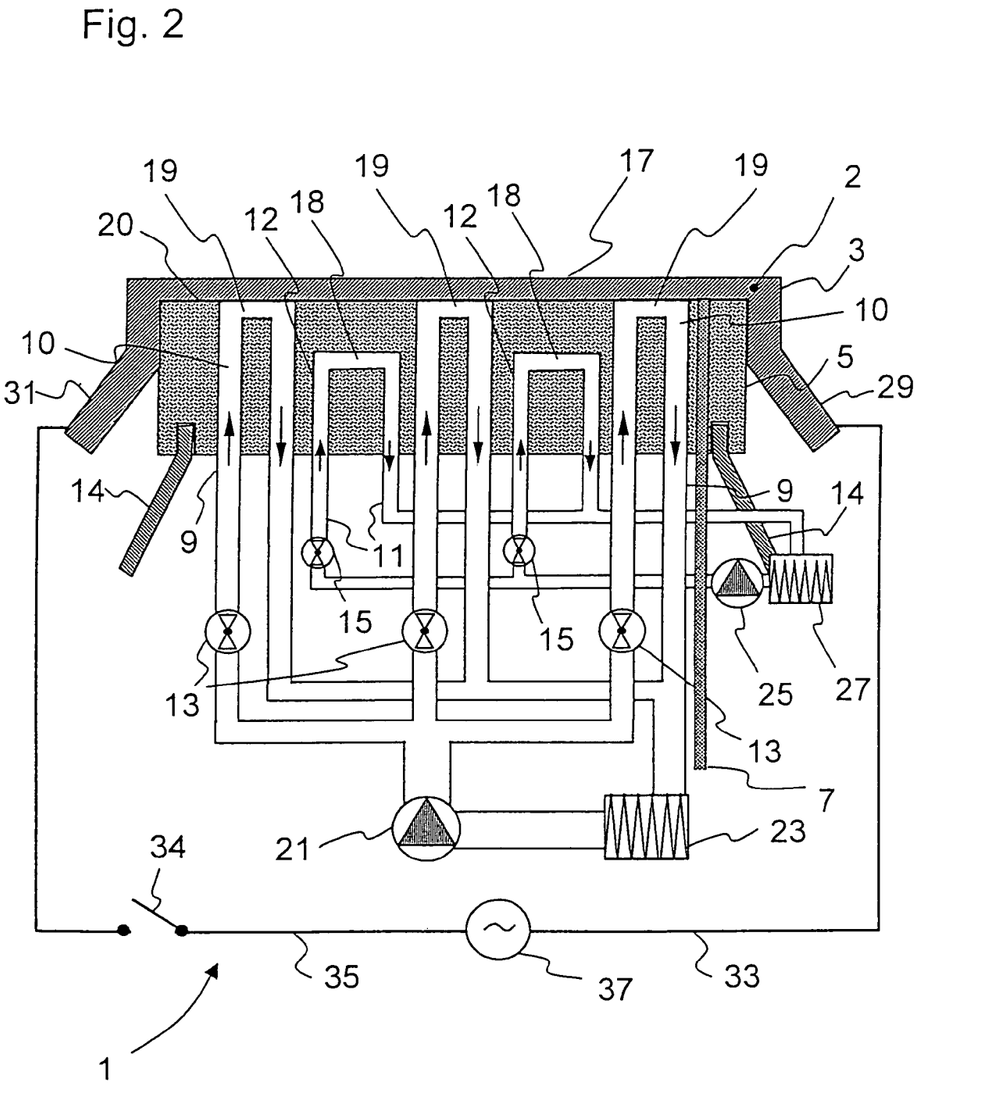
FIG. 2 shows a diagrammatic cross section through a second embodiment of the heating apparatus according to the invention.

FIGS. 1 and 2 diagrammatically depict cross-sectional illustrations of two embodiments of the heating apparatus according to the invention, which is denoted overall by reference numeral 1.

The heating apparatus 1 has an electrode 3 with a melt contact material 2, which is connected to a supporting apparatus 5 and one side of which bears against the supporting apparatus 5.

The electrode 3 is connected to electrical supply conductors 7, which can be connected to a power supply for the purpose of conductive heating of a melt. In this embodiment, the supporting apparatus 5 is also provided with metal holding plates 14, which are used to fit and secure the heating apparatus 1 to a melting unit.

The heating apparatus 1 may also be arranged displaceably in a melting unit. In this case, the heating apparatuses 1 can be secured by the metal holding plates 14 to a displacement device, by means of which the heating apparatuses 1, arranged, for example, opposite one another in the unit, can then be moved toward or away from one another. An arrangement of this type is advantageous, for example, when starting up while the melt is still relatively cool and has a low electrical conductivity.

It is preferable for the heating apparatus 1 to be integrated in a melting or refining unit in such a way that the melt contact material 2 forms a wall region of a crucible, in particular of a skull crucible. The heating apparatus 1 is in this case fitted in such a way that the supporting apparatus 5 is arranged on that side of the electrode 3 which is remote from the melt contact region or the melt contact surface 17 of the melt contact material 2. The melt contact material 2 is made from a material which is resistant to the composition of the melt. A suitable melt contact material 2 for glass melts is electrically conductive ceramic, such as for example $SnO_2$ ceramic, and/or refractory metals, in particular high-melting metals, such as tungsten, molybdenum, osmium, hafnium, tantalum or alloys thereof, and/or platinum metals, in particular platinum, iridium, rhodium and alloys thereof.

In the embodiment illustrated in FIG. 1, the supporting apparatus 5 is constructed in sandwich form. In this case, the supporting apparatus has a first layer 51, which is arranged between the electrode 3 and a subsequent second layer 52. The first layer 51 has a higher thermal conductivity than the second layer 52. The first layer 51 may, for example, be a fused-cast material, such as AZS or HZFC. A suitable material for the second layer 52 is, for example, a material such as mullite or Quarzal with a relatively poor thermal conductivity. The sequence of layers with different thermal conductivities leads to the heat on the one hand being dissipated well from the melt contact material 2 but on the other hand only a small portion of the heat being discharged to the outside. In this way, the majority of the heat is discharged via the cooling systems.

FIG. 1 shows a first embodiment of the invention, in which the electrode 3 includes a melt contact material 2 comprising a metallic material, for example a refractory metal, such as tungsten, molybdenum and/or platinum, rhodium, iridium, as well as alloys thereof. The melt contact material 2 has been applied to a refractory material 8 or an electrically conductive ceramic, such as for example an $SnO_2$ ceramic. The supporting apparatus 5 has a multiplicity of connections 9 which are connected to fluid-conducting passages 10 in the interior of the supporting apparatus, with the connections 9, as well as the fluid-conducting passages 10 connected to them, forming parts of a first cooling system.

Moreover, the supporting apparatus 5 has a multiplicity of further connections 11, which are likewise connected to fluid-conducting passages 12 in the interior of the supporting apparatus. These connections 11 and the fluid-conducting passages 12 connected to them form part of a further cooling system.

The cross-sectional view diagrammatically depicts how, in this embodiment, in each case two connections 9 are connected to one fluid-conducting passage 10 of the first cooling system, with one connection 9 being used to supply coolant and a further connection 9 being used to return coolant.

The direction of flow of the coolant is indicated by arrows.

A section 19 of the fluid-conducting passages 10 of the first cooling system extends along the side 20 of the supporting apparatus 5 against which the electrode 3 bears. These sections 19 are in particular designed in such a way that they extend in the second layer 52 of the supporting apparatus 5, along the contact surface between first layer 51 and second layer 52 made from a refractory material 8 of the sandwich structure and are open toward the first layer 51. As a result, when the coolant flows through the fluid-conducting passages 10 in the region of these sections 19, the coolant is in direct contact with the first layer, which is of good thermal conductivity and against which the melt contact material 2 of the electrode 3 bears. The first layer 51 is in this case preferably designed to be as thin as possible. The first layer 51 here serves in particular to mechanically support the melt contact material 2, in order to prevent deformations caused by the hydrostatic pressure exerted by the melt. Designing the first layer 51 to be as thin as possible achieves good cooling combined with a low inertia with regard to the controllability of the cooling power in the melt contact material 2.

Each of the fluid-conducting passages 10 is connected to a setting or control valve 13, which in this embodiment is in each case connected to that one of the connections 9 which serves as a feed line. The coolant is pumped through the fluid-conducting passages 10 from a fluid-delivery device 21, via the setting or control valves 13, and ultimately into a cooler 23, where the heat which the coolant has absorbed in the fluid-conducting passages 10 is extracted again.

In a preferred embodiment, the first cooling system comprises a fluid-delivery device 21 which allows the fluid to be delivered with low pressure differences between the entry and exit of the device, these pressure differences amounting to up to 1 000 mbar, since at these pressures it is possible to use inexpensive piston-free fluid pumps, in particular blowers. A particularly preferred embodiment allows the fluid to be delivered at pressures of up to 500 mbar, and the most preferred embodiment allows the fluid to be delivered at 150 mbar. In this embodiment, the fluid-conducting passages 10 are each provided with cross sections which ensure that sufficient fluid is delivered at these low pressures. This is particularly advantageous if gases and/or aerosols, such as in particular ambient air or ambient air with a controlled water content, are used for cooling, since in this case even simple blowers can be used instead of pneumatic pump systems.

However, according to a further embodiment it is also possible for the cooling fluid used to be compressed air. The use of compressed air offers the advantage that the cross section of the fluid-conducting passages 10 can be reduced. This gives the possibility, inter alia, of accommodating more passages in the supporting device 5 and thereby, for example, achieving a higher positional resolution when controlling or setting the local cooling power. It is also possible for the fluid-conducting passages 10 with a small cross section to be designed, for example, to be opened toward the melt contact material 2 without the material above the open passages being deformed.

In addition or as an alternative to the use of pressurized fluid, it is also possible for a suction apparatus to be arranged on the outgoing-air side, which independently or together with the blower or blowers increases the throughput of cooling fluid. On account of the correspondingly large cross sections of the fluid-conducting passages 10, inexpensive piston-free suction systems can preferentially also be used for the suction apparatus.

The further cooling system is also designed in a similar way. In this cooling system too, each of the fluid-conducting passages 12 has a section 18 which extends along the side 20 of the supporting apparatus. However, the sections 19 of the fluid-conducting passages 10 of the first cooling system are arranged closer to the melt contact surface 17 of the electrode 3 than the fluid-conducting passages 12 of the further cooling system and their sections 18 running along the side 20. The sections 18, unlike the sections 19, are also not open toward the electrode 3.

As in the first cooling system, so too in the further cooling system a fluid-conducting passage 12 is connected to in each case two connections 11, in each case one of which serves as a feed line connection and the other serves as a return line connection. The feed line connection is in each case connected to a setting or control valve 15. As in the case of the first cooling system, the coolant or cooling fluid is pumped through the fluid-conducting passages 12 via the setting or control valves 15 and into a cooler 27, where the heated coolant is cooled again, by means of a fluid-delivery device 25.

When a melting unit which has been filled with solidified material to be melted, for example in the form of charge cullet or batch, starts to operate, initially there is no conductive connection between the melt contact material 2 of the heating devices 1 arranged in the unit. In particular, during this phase there is as yet no conductive bridge from the melt contact material 2 to the material to be melted. To produce this conductive bridge, it is advantageous if the heating apparatus 1 has a further heating apparatus in the form of a device for heating the electrode which is suitable for heating the melt or glass contact material. For this purpose, by way of example, a transverse current which flows substantially parallel to the surface of the melt contact material 2 can be fed into the latter, so that the ohmic resistance of the electrode 3 heats the latter and thereby effects the additional heating and initial melting of the material to be melted or the glass. In the embodiments illustrated in FIGS. 1 and 2, an ohmic heating apparatus of this type comprises a power supply 37, which is connected to terminals 29, 31 of the electrode 3 via electrical supply conductors 33 and 35. The current from the current supply 37 therefore flows through the melt contact material 2 as a transverse current via the terminals. The transverse current mode in the electrode can be switched on or off by a suitable switch 34 and/or by connecting or disconnecting the power supply 37. By way of example, when the melt has reached a sufficient conductivity, so that it can be heated further by conductive heating, the transverse current mode can be switched off.

The device for heating the electrode may advantageously also comprise a device for heating the cooling fluid. While the melt or batch is being heated up, therefore, the melt contact surface 17 can additionally also be heated by a device for heating the cooling fluid. In this case, the cooler 23 may have heating devices, such as for example heat exchangers, electrical resistance heating devices or fossil fuel heating devices. Preheating by heating the coolant is advantageous, for example, in order to prevent the precipitation of moisture on the electrode 3 by the latter being heated to above the dew point of the top furnace atmosphere. Relatively large quantities of moisture can form in the melting unit while the unit is being started up if the material to be melted or batch in the unit is likewise preheated using fossil burners.

Under normal operating conditions, the cooled coolant is then fed back to the fluid-delivery device 25, thereby producing a closed coolant circuit.

The first cooling system is preferably operated with a gaseous coolant, in particular with air. Accordingly, the fluid-delivery device 21 may comprise a blower. The further cooling system may, for example, use a liquid coolant. Furthermore, it is possible to use a mixture of gas and liquid in which the liquid content can be set or controlled, in order in this way to ensure a very defined dissipation of heat. In this case, the liquid, which is dissolved in the gas or in the form of an aerosol, can extract heat of condensation, for example at the phase change from liquid to gaseous, or if the liquid fraction is in dissolved form, the level of the cooling action can be monitored very accurately.

FIG. 2 shows a second embodiment of the invention, in which the supporting apparatus 5 is not constructed in sandwich form. In this embodiment, a section 19 of the fluid-conducting passages 10 of the first cooling system likewise extends along the side 20 of the supporting apparatus 5 against which the electrode 3 bears. In this embodiment, the sections 19 are open directly toward the electrode 3. This produces direct contact between the coolant and the electrode 3, thereby achieving particularly successful and quickly controllable cooling. A heat transfer barrier, as is formed between two layers in a sandwich structure of the supporting apparatus, is also avoided.

However, in this case the melt contact material 2 of the electrode 3 must be sufficiently strong, even at the high temperatures of use, to prevent deformation or even cracking-open of the melt contact material 2, which is unsupported in the region of the sections 19, as a result of the hydrostatic pressure of the melt. By way of example, refractory metals, such as for example tungsten, are suitable for this purpose. However, the oxidation resistance of these metals is not as high as that of platinum metals, which means that under certain circumstances they may have to be protected from the action of oxygen.

Figure 3A:
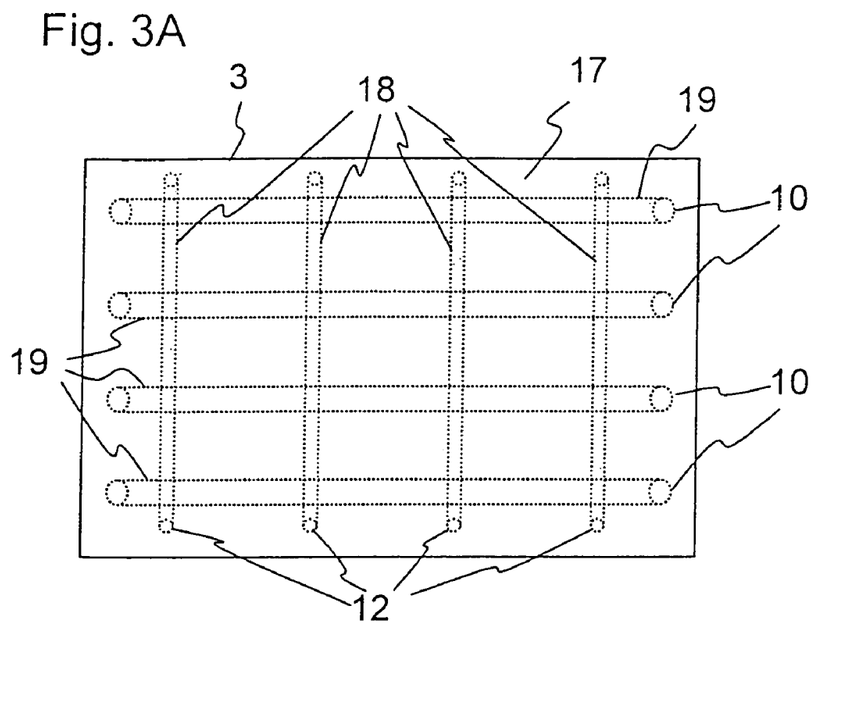
FIGS. 3A and 3B show views of the melt contact surface of two embodiments of the heating apparatus according to the invention.

FIG. 3A shows a plan view of the melt contact surface 17 of the electrode 3 of one embodiment of the invention. The melt contact surface 17 of this embodiment is illustrated in rectangular form, but a multiplicity of forms of the electrode 3 are possible depending on the specific way in which the heating apparatus 1 is adapted to the specific shape and design of the melting unit.

The fluid-conducting passages 10 and 12 of the first cooling system, which in the plan view illustrated run below the electrode 3, are illustrated by dashed lines.

In this embodiment, the sections 18 of the fluid-conducting passages 12 of the further cooling system are arranged in such a way that they run transversely with respect to the sections 19 of the fluid-conducting passages 10 of the first cooling system, in a direction perpendicular to the heat propagation direction. This crossed arrangement and setting or control of the cooling power of the individual passages allows the lateral temperature distribution and/or the cooling power on the melt contact surface 17 of the electrode 3 to be influenced and virtually any desired two-dimensional temperature and/or cooling power distribution to be set.

Figure 3B:
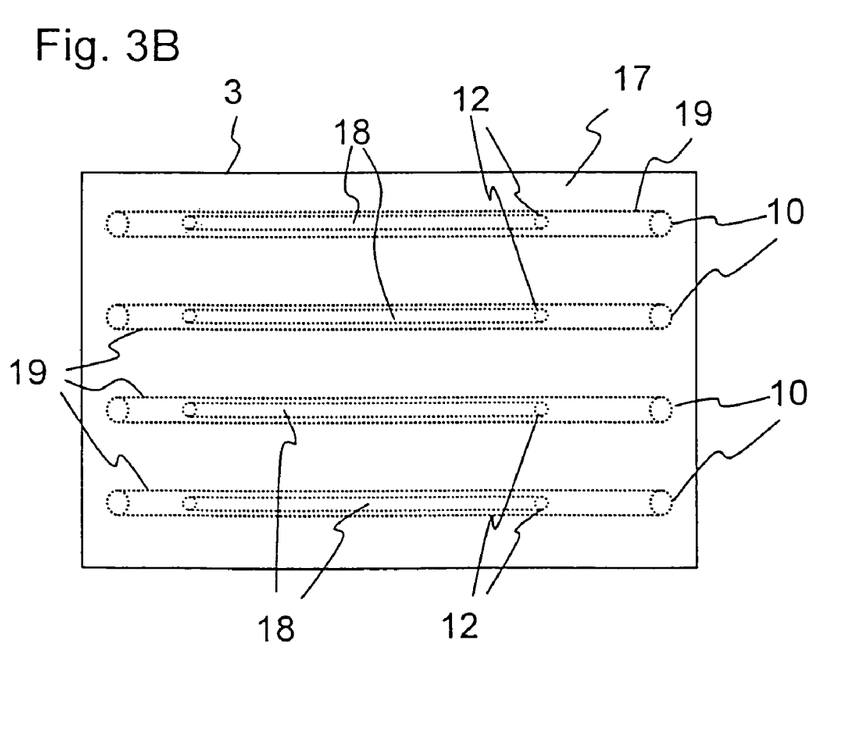

FIG. 3B shows a plan view of the melt contact surface 17 of the electrode 3 of a further embodiment of the invention. In this case, the sections 18 and 19 of the first and second cooling systems do not run transversely, but rather parallel with respect to one another, in a direction along the melt contact surface 17. In particular, the fluid-conducting passages 11 and 12 are also guided into one another in the region of the sections 18. By way of example, the sections 18 of the second cooling system may comprise metallic cooling tubes which are laid inside the sections 19 of the first cooling system. This produces a particularly compact overall construction, and also achieves additional cooling of the cooling fluid of the first cooling system.

Figure 4:
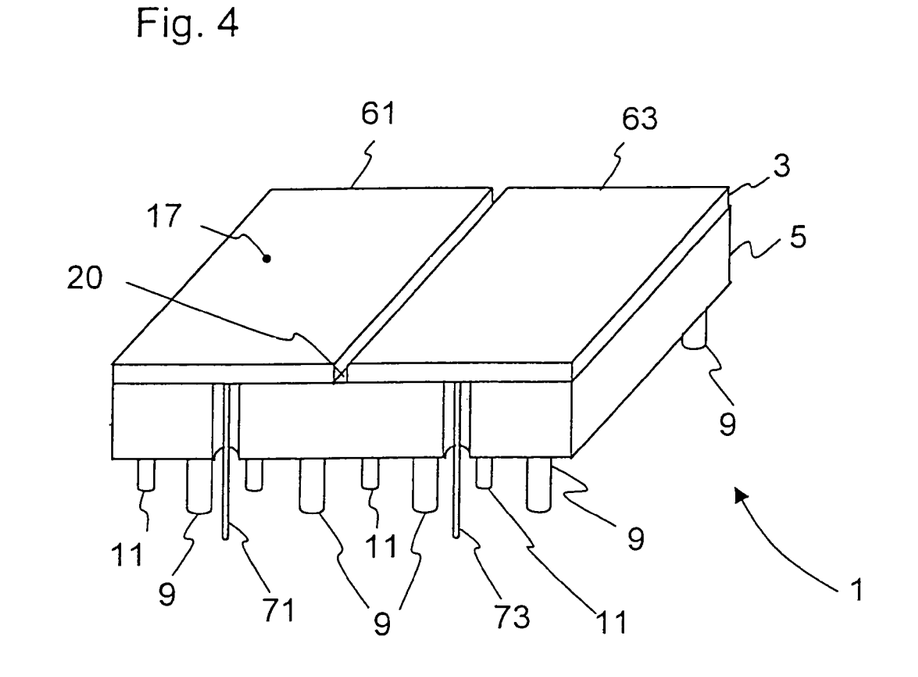
FIG. 4 shows a diagrammatic view of an embodiment of the heating apparatus according to the invention with segmented electrode.

FIG. 4 illustrates a diagrammatic view of one embodiment of the heating apparatus 1 according to the invention with segmented electrode 3. This embodiment, similarly to the embodiment illustrated in FIG. 1, has a supporting apparatus 5 made from refractory material, to which connections 9 and 11 for the fluid-conducting passages 10 and 12 of the cooling systems inside the supporting device 5 are fitted.

The electrode 3 of this embodiment is divided into two segments 61 and 63, in such a way that the melt contact surface 17 is also divided into two parts.

The segments 61 and 63 are arranged in such a way on the side 20 of the supporting apparatus 5 that they are not in contact with one another. As a result, provided that the refractory material of the supporting apparatus 5 is nonconductive, the segments 61 and 63 are insulated from one another.

Each of the segments 61 and 63 has a dedicated electrical supply conductor 71 and 73, respectively. This, in combination with the insulated arrangement of the segments 61 and 63, makes it possible, for example, for the segments 61 and 63 to be operated independently of one another for local control or setting of the heating power.

Moreover, a voltage can be applied between individual electrode segments, for example between the segments 61, 63 of an electrode 3, which produces conductive heating of the material to be melted in the vicinity of the segmented electrode parts. This operation can be controlled independently of the standard currents between a pair of electrodes used for conductive heating, and can, for example, be used during the starting phase to liquefy the material to be melted in front of the electrode 3 over a wider area, in order in this way to produce the conductive heating action more quickly and in a region of larger area, i.e. with a larger active cross section of the flowing current.

The apparatus according to the invention means that the melting temperature, in particular of core regions of the melt, can be more than 200° C. above the highest temperature at the melt contact surface 17 of the electrode 3 without this leading to increased wear to the electrode 3 or increased introduction of impurities into the melt itself.

The increase in temperature between the electrode 3, in particular the glass or melt contact surface 17 of the electrode 3, and the core regions of the melt described above also correspondingly improves and accelerates the refining of the melt. In particular, the temperature of the melt, on account of the increase in temperature, can be above the application limit temperature of the melt contact material 2, since the melt contact material 2 can be kept below this maximum permissible temperature by means of the cooling.

However, the invention provides advantages even if the temperature of the melt is only 50° C., 100° C. or 200° C. above the temperature of the electrode 3. This increase in temperature or the temperature of the melt can be recorded, for example by means of thermocouples, pyrometers or other methods known to the person skilled in the art, and the measured values from this recording can be incorporated in control of the cooling and/or heating power.

Figure 5:
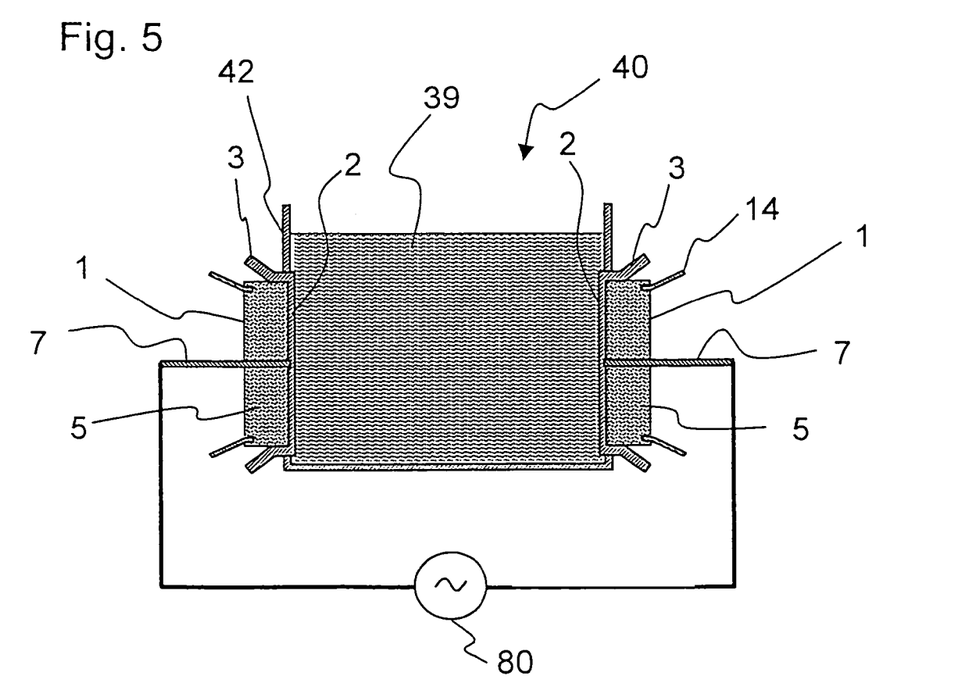
FIG. 5 shows a diagrammatic view of a melting unit for the conductive heating of melts.

FIG. 5 shows a diagrammatic cross section through a melting or refining unit, which is denoted overall by 40 and in which heating apparatuses 1 according to the invention are used to heat a melt 39 that is present in the unit 40. The cooling systems and the devices for the ohmic heating of the electrodes 3 by transverse current mode are not illustrated in FIG. 5, for the sake of clarity.

For conductive heating of the melt 39, two of the heating apparatuses 1 are secured in respective openings in the walls 42 of the melting unit 40 and secured by means of the metal holding plates 14. In this case, the melt contact material 2 of the electrodes 3 fills the respective opening, and thereby forms part of the walls 42. It is preferable for the heating apparatuses 1 to be arranged at opposite walls of the melting unit 40.

The supply conductors 7 for the heating apparatuses 1 are connected to a current or voltage supply 80 for conductive heating of the melt 39. Application of a voltage to the opposite electrodes 3, when the conductivity is sufficient, causes a current to flow through the melt 39, thereby conductively heating the latter. As a result of the conductive heating, the heating power is distributed through the melt 39 over the entire current path, with the result that the melt 39 is heated very uniformly.

Furthermore, it is within the scope of the invention to provide not just melting or refining apparatuses with the heating apparatuses described above, but also for these heating apparatuses to be used in conditioning devices and in particular also in channels for transporting the molten material.

LIST OF DESIGNATIONS

1 Heating apparatus
2 Melt contact material
3 Electrode
61, 63 Electrode segments
5 Supporting apparatus
7, 71, 73 Electrical supply conductors
8 Refractory material
9 Connections to fluid-conducting passages of the first cooling system
10 Fluid-conducting passage of the first cooling system
11 Connections to fluid-conducting passages of the further cooling system
12 Fluid-conducting passage of the further cooling system
13 Setting or control valve of the first cooling system
14 Metal holding plate
15 Setting or control valve of the further cooling system
17 Melt contact surface
18 Section of the fluid-conducting passage 11
19 Section of the fluid-conducting passage 9
20 Side of the supporting apparatus against which the electrode 3 bears
21 Fluid-delivery device of the first cooling system
23 Cooler of the first cooling system
25 Fluid-delivery device of the further cooling system
27 Cooler of the further cooling system
29, 31 Terminals
33, 35 Supply conductors for transverse current mode
34 Switch for transverse current mode
37 Power supply for transverse current mode
39 Melt
40 Melting unit
42 Walls of the melting unit 40
51 First layer of the supporting apparatus 5
52 Second layer of the supporting apparatus 5
80 Power supply for the conductive melt heating

The invention claimed is:

1. A heating apparatus for the conductive heating of a melt, comprising:
   at least one electrode; and
   a first cooling system configured to transport a cooling fluid to cool the at least one electrode, the first cooling system having means for controlling a cooling power variably as a function of time and location in a plurality of selectable regions of the at least one electrode.

2. The heating apparatus as claimed in claim 1, wherein the first cooling system comprises a fluid-delivery device for delivering the cooling fluid at low pressure differences of up to 1 000 mbar.

3. The heating apparatus as claimed in claim 2, wherein the fluid-delivery device is set with respect to a variable selected from the group consisting of a temperature, a liquid content, a quantitative flow of the cooling fluid, and any combinations thereof.

4. The heating apparatus as claimed in claim 2, wherein the first cooling system comprises a multiplicity of first fluid-conducting passages.

5. The heating apparatus as claimed in claim 4, wherein the multiplicity of first fluid-conducting passages include portions that run transversely with respect to one another.

6. The heating apparatus as claimed in claim 4, wherein the multiplicity of first fluid-conducting passages are connected to a device for setting a through-flow of the cooling fluid.

7. The heating apparatus as claimed in claim 6, wherein the device for setting the through-flow of the cooling fluid comprises a setting or control valve.

8. The heating apparatus as claimed in claim 2, wherein the fluid-delivery device can be controlled with respect to a temperature, a liquid content and/or a quantitative flow of the cooling fluid.

9. The heating apparatus as claimed in claim 1, wherein the cooling fluid comprises air and/or a liquid and/or an aerosol.

10. The heating apparatus as claimed in claim 1, further comprising a second cooling system and means for setting the first and second cooling systems independently of one another.

11. The heating apparatus as claimed in claim 10, wherein the second cooling system comprises a multiplicity of second fluid-conducting passages.

12. The heating apparatus as claimed in claim 11, wherein the multiplicity of second fluid-conducting passages comprise sections that run transversely with respect to sections of the multiplicity of first fluid-conducting passages.

13. The heating apparatus as claimed in claim 11, wherein the multiplicity of second fluid-conducting passages comprises sections that run parallel to sections of the multiplicity of first fluid-conducting passages.

14. The heating apparatus as claimed in claim 13, wherein the sections of the multiplicity of second fluid-conducting passages and the sections of the multiplicity of first fluid-conducting passages are coaxial to one another.

15. The heating apparatus as claimed in claim 11, wherein the multiplicity of first and second fluid-conducting passages are arranged in such a way that at least a section of the multiplicity of first fluid-conducting passages is arranged closer to a melt contact surface of the at least one electrode than the multiplicity of second fluid-conducting passages.

16. The heating apparatus as claimed in claim 1, wherein the at least one electrode comprises a supporting apparatus.

17. The heating apparatus as claimed in claim 16, wherein the supporting apparatus is arranged on a side of the at least one electrode that is remote from a melt contact surface of the at least one electrode.

18. The heating apparatus as claimed in claim 17, wherein the side of the at least one electrode that is remote from the melt contact surface bears against one side of the supporting apparatus and wherein the one side of the supporting apparatus has at least a section of a fluid-conducting passage extending therealong.

19. The heating apparatus as claimed in claim 18, wherein the section is open toward the at least one electrode.

20. The heating apparatus as claimed in claim 16, wherein the supporting apparatus is a multilayer structure.

21. The heating apparatus as claimed in claim 16, wherein the support apparatus includes a first layer, which is arranged between the at least one electrode and at least one subsequent second layer of the supporting apparatus, the first layer having a higher thermal conductivity than the at least one subsequent second layer.

22. The heating apparatus as claimed in claim 21, wherein the first layer comprises a fused-cast and/or dense-sintered material.

23. The heating apparatus as claimed in claim 1, wherein the at least one electrode comprises at least two electrode segments.

24. The heating apparatus as claimed in claim 23, wherein the at least two electrode segments are insulated with respect to one another.

25. The heating apparatus as claimed in claim 1, wherein the at least one electrode includes a melt contact material that comprises a material selected from the group consisting of an electrically conductive ceramic, $SnO_2$ ceramic, refractory metals, high-melting metals, tungsten, molybdenum, osmium, hafnium, tantalum, platinum metals, platinum, iridium, rhodium, alloys of any of the foregoing, and any combinations thereof.

26. The heating apparatus as claimed in claim 1, wherein the at least one electrode includes a melt contact material which comprises a fine-grain-stabilized material.

27. The heating apparatus as claimed in claim 1, wherein the at least one electrode forms a wall region of a skull crucible.

28. The heating apparatus as claimed in by claim 1, further comprising at least one temperature sensor.

29. The heating apparatus as claimed in claim 1, wherein the at least the first cooling system comprises at least one flowmeter.

30. The heating apparatus as claimed in claim 1, further comprising a heating power control, for controlling a heating current as a function of a variable selected from the group consisting of the cooling power, a melting temperature of the melt, an electrode temperature, and any combinations thereof.

31. The heating apparatus as claimed in claim 1, further comprising a device for heating the at least one electrode.

32. The heating apparatus as claimed in claim 31, wherein the device for heating the at least one electrode comprises an ohmic heating device which is suitable for heating the melt and/or parts of the at least one electrode itself.

33. The heating apparatus as claimed in claim 31, wherein the device for heating the at least one electrode comprises a device for heating the cooling fluid.

34. The heating apparatus as claimed in claim 1, wherein the heating apparatus forms part of a wall of a melting unit.

35. The heating apparatus as claimed in claim 34, further comprising edges of the heating apparatus that are cooled in the region in which they adjoin the walls of the melting unit.

36. A melting unit for the conductive heating of a melt, comprising:
   an electrode; and
   a cooling system configured to transport a cooling fluid to cool the electrode, the first cooling system having a controller that controls a cooling power variably as a function of time and location in a plurality of selectable regions of the electrode.

37. A heating apparatus for the conductive heating of a melt, comprising:
   at least one electrode having a plurality of selectable regions; and
   a first cooling system configured to transport a cooling fluid to cool the plurality of selectable regions, the first cooling system having a controller configured to control a cooling power of the first cooling system in at least some of the plurality of selectable regions variably with respect to others of the plurality of selectable regions.

* * * * *